US011271903B2

(12) United States Patent
Sidhartha et al.

(10) Patent No.: US 11,271,903 B2
(45) Date of Patent: Mar. 8, 2022

(54) EFFICIENT MANAGEMENT OF SECURE NAME LOOKUP QUERY MESSAGES (71) Applicant: Nutanix, Inc., San Jose, CA (US)

(72) Inventors: Kumar Sidhartha, Bangalore (IN); Shivam Gupta, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 398 days.

(21) Appl. No.: 16/661,597

(22) Filed: Oct. 23, 2019

(65) Prior Publication Data
US 2021/0044566 A1 Feb. 11, 2021

Related U.S. Application Data (60) Provisional application No. 62/883,572, filed on Aug. 6, 2019.

(51) Int. Cl.
*H04L 29/06* (2006.01)
*G06F 16/23* (2019.01)
*H04L 61/5007* (2022.01)
*H04L 61/4511* (2022.01)

(52) U.S. Cl.
CPC ...... *H04L 63/0245* (2013.01); *G06F 16/2379* (2019.01); *H04L 61/1511* (2013.01); *H04L 61/2007* (2013.01); *H04L 63/0428* (2013.01); *H04L 63/123* (2013.01); *H04L 63/20* (2013.01)

(58) Field of Classification Search
CPC ............. H04L 63/0245; H04L 61/1511; H04L 61/2007; H04L 63/0428; H04L 63/123; H04L 63/20; G06F 16/2379
See application file for complete search history.

(56) References Cited

U.S. PATENT DOCUMENTS

| 8,549,518 | B1 | 10/2013 | Aron et al. |
| 8,601,473 | B1 | 12/2013 | Aron et al. |
| 8,850,130 | B1 | 9/2014 | Aron et al. |
| 9,772,866 | B1 | 9/2017 | Aron et al. |
| 11,140,196 | B1 * | 10/2021 | Bilge .................... H04L 63/166 |

(Continued)

OTHER PUBLICATIONS

Amir Herzberg et al. "Less is more: cipher-suite negotiation for DNSSEC", Dec. 2014.

(Continued)

*Primary Examiner* — Arvin Eskandarnia
(74) *Attorney, Agent, or Firm* — Shun Yao; Yao Legal Services, Inc.

(57) ABSTRACT

One embodiment of the present invention provides a system. During operation, the system determines a first set of ciphers supported by a name server based on a name lookup response message. The system then inserts an entry associated with the name server in a data structure stored in a local storage device. Subsequently, the system identifies a second set of ciphers supported by a local name server in a name lookup query message destined to the name server. The system then selects the name lookup query message for an update operation based on the entry in the data structure. The update operation includes removing ciphers from the name lookup query message except a common cipher, which is present in both the first and second sets of ciphers. The system determines an egress port corresponding to the name server for the updated name lookup query message.

20 Claims, 10 Drawing Sheets

(56) References Cited

U.S. PATENT DOCUMENTS

2019/0319933 A1* 10/2019 Jiang .................... G06F 9/5083

OTHER PUBLICATIONS

1 Poitras, Steven. "The Nutanix Bible" (Oct. 15, 2013), from http://stevenpoitras.com/the-nutanix-bible/Publication date based on indicated capture date by Archive.org; first publication date unknown); pp. all.

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/ pp. all.

Poitras, Steven. "The Nutanix Bible" (Jan. 12, 2016), from https://nutanixbible.com/ pp. all.

Poitras, Steven. "The Nutanix Bible" (Jun. 9, 2016), from https://nutanixbible.com/ pp. all.

Poitras, Steven. "The Nutanix Bible" (Jan. 3, 2017), from https://nutanixbible.com/ pp. all.

Poitras, Steven. "The Nutanix Bible" (Jun. 8, 2017), from https://nutanixbible.com/ pp. all.

Poitras, Steven. "The Nutanix Bible" (Jan. 3, 2018), from https://nutanixbible.com/ pp. all.

Poitras, Steven. "The Nutanix Bible" (Jun. 25, 2018), from https://nutanixbible.com/ pp. all.

Poitras, Steven. "The Nutanix Bible" (Jan. 8, 2019), from https://nutanixbible.com/ pp. all.

Poitras, Steven. "The Nutanix Bible" (Jul. 25, 2019), from https://nutanixbible.com/ pp. all.

Poitras, Steven. "The Nutanix Bible" (Sep. 17, 2019), from https://nutanixbible.com/ pp. all.

Cano, Ignacio et al. "Curator: Self-Managing Storage for Enterprise Clusters"; University of Washington; published Mar. 2017; pp. all.

Poitras, Steven. "The Nutanix Bible" (Jan. 21, 2020), from https://nutanixbible.com/ pp. all.

* cited by examiner

FIG. 1A

CSN TABLE 150

| SERIAL NO. 152 | IDENTIFIER 154 | CIPHER SUITE 156 | TTL 158 |
|---|---|---|---|
| 1 | 10.0.0.1 | C1, C2, C3 | 4 |
| 2 | 10.0.0.2 | C4, C5 | 7 |

EFFICIENT MANAGEMENT OF SECURE NAME LOOKUP QUERY MESSAGES

RELATED APPLICATIONS

This application claims the benefit of U.S. Provisional Application No. 62/883,572, titled "Efficient Packet Management of Secure DNS Lookup Queries," by inventors Kumar Sidhartha and Shivam Gupta, filed 6 Aug. 2019, the disclosure of which is incorporated by reference herein.

BACKGROUND

Field

The present disclosure relates to traffic forwarding in a communication network. More specifically, the present disclosure relates to managing packets (e.g., packet sizes) of secure name lookup queries.

Related Art

Domain Name System (DNS) facilitates mapping between a domain name and the corresponding Internet Protocol (IP) address. This allows a user to access a web resource (e.g., a web page or a piece of content) based on the name of the web resource. DNS Security Extensions (DNSSEC) protects the DNS service against various types of malicious activities, such as cache poisoning attacks and distributed denial of service (DDoS) attack.

DNSSEC can be considered as a cryptographic layer of DNS. The name resolutions from the name servers are cryptographically encrypted using different ciphers (e.g., hash functions) and associated cryptographic information (e.g., a zone signing key and key signing key). However, since DNS is a distributed system, each zone may support its cipher based on the security requirements of the zone. In the absence of a global cipher, a local DNS server (or a local server) may not know which cipher a name server may support. As a result, the local server appends a list of its ciphers with each name lookup query message.

Upon receiving the query, the name server may select a cipher that is supported by both servers. The name server can then encrypt the response message, which can include the name resolution, based on the selected cipher. Subsequently, the name server sends the encrypted response message back to the local server. Appending a list of ciphers to each lookup query significantly increases the size of the lookup query messages. This can lead to a number of issues, such as network congestion, IP-level fragmentation, and amplified DDoS attacks.

While DNSSEC brings many desirable features to name resolution in the Internet, some issues remain unsolved in efficiently managing secure name lookup queries.

SUMMARY

One embodiment of the present invention provides a system that facilitates efficient management of secure name lookup query messages. During operation, the system determines a first set of ciphers supported by a name server based on a name lookup response message. The system then inserts an entry associated with the name server in a data structure stored in a local storage device. Subsequently, the system identifies a second set of ciphers supported by a local name server in a name lookup query message from the local name server. The name lookup query message can be destined to the name server. The system then selects the name lookup query message for an update operation based on the entry in the data structure. The update operation includes removing ciphers from the name lookup query message except a common cipher, which is present in both the first and second sets of ciphers. The system determines an egress port corresponding to the name server for the updated name lookup query message.

In a variation on this embodiment, the name server is a domain name system (DNS) server, and the name lookup response message is a Domain Name System Security Extensions (DNSSEC) message.

In a variation on this embodiment, the system sends the name lookup query message to a management device capable of configuring the switch and receives the updated name lookup query from the management device.

In a further variation, the management device is one of. a controller of a software-defined network (SDN), and a control plane manager configured to facilitate control information to the switch.

In a further variation, the system sends a notification message to the management device. The notification message includes the first set of ciphers and an identifier of the name server.

In a further variation, the system receives, from the management device, a notification message comprising information associated with a second name server. The system then inserts a second entry associated with the second name server in the data structure.

In a variation on this embodiment, the entry of the data structure comprises one or more of. an identifier of the name server and a time to leave (TTL) value associated with the entry; and the first set of ciphers.

In a variation on this embodiment, if the system receives a second name lookup response message from the name server, the system refreshes the entry.

In a variation on this embodiment, selecting the name lookup query message can include looking up an identifier of the name server in the data structure and selecting the name lookup query message for an update operation if the entry is identified in the data structure based on the lookup.

In a variation on this embodiment, the system selects the common cipher, which is present in both the first and second sets of ciphers, based on a selection policy. The system can then execute the update operation based on the common cipher.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments described herein solve the problem of forwarding secure name lookup queries in an efficient way by (i) learning the ciphers of a name server from query response messages, and (ii) selecting a cipher for a name lookup query message based on the learned ciphers and removing the rest of the ciphers from the query message. As a result, the size of the query message is significantly reduced, which facilitates the efficient forwarding of the query message.

Typically, when a user requests a web resource based on a name, the user device queries a local server to obtain a corresponding address. The local server can be a local resolver in a network (e.g., a local DNS server) of the user device. If the local server has previously resolved the name, the local server may have cached the resolution for a predetermined period (e.g., as indicated by a time to leave (TTL) value). The local server can then resolve the query based on the local cache. However, if the cache of the local server does not include an entry for the name, the local server can send a name lookup query message to a name server (e.g., a global or distributed DNS server at an upper level of DNS hierarchy) for a name resolution. To securely respond to the query, the name server can encrypt a response message comprising the name resolution using a cipher.

With existing technologies, ciphers for a name server may vary. Consequently, the local server may not be aware of the ciphers supported by the destination name server. Similarly, the name server may not be aware of the ciphers supported by the local server. Hence, to facilitate secure communication, the local server can include the local cipher suite, which includes a list of ciphers supported by the local server, in the query message. Upon receiving the query message, the name server selects a cipher that is supported by both servers. The servers can use Cipher Suite Negotiation Protocol (SCNP) to determine a common set of cryptographic functions supported by both servers. The name server then encrypts response message, which includes the resolution of the query, based on the selected cipher, and sends the encrypted response message to the local server.

However, including the cipher suite significantly increases the size of the query message. A large query message can lead to several issues in a network, such as network congestion, IP fragmentation, and amplified DDoS attacks. In particular, if a name server is queried repeatedly and the same local server repeatedly sends its cipher suite, the underlying network traffic can be significant and unnecessary.

To solve this problem, in addition to a name resolution, the name server can include its cipher suite in a response message. Upon receiving the response message, a switch in a network can obtain the cipher suite from the response message. The switch can then create an entry corresponding to the name server in a local cipher suite negotiation (CSN) table. The entry can include an identifier (e.g., an IP address) of the name server, the cipher suite, and a TTL associated with the cipher suite. In this way, the switch can learn the cipher suite of the name server. If the TTL expires, the switch may remove the entry. This allows the switch to remove stale entries from the local CSN table.

In some embodiments, the switch sends a notification message comprising the cipher suite to a management device of the network. Examples of the management device include, but are not limited to, a controller of a software-defined network (SDN) and a control plane manager configured to facilitate control information to the switch. The management device can then create an entry corresponding to the name server in a central CSN table. This entry can also include the identifier of the name server, the cipher suite, and the corresponding TTL.

Whenever a name lookup query message destined to the name server passes through the switch, the switch can obtain the cipher suite of the local server from the query message and determine that the ciphers for both the local server and the name server are known. Consequently, the switch can determine that the network can select one of the common ciphers. The switch then forwards the query message to the management device. The management device obtains the cipher suite of the local server from the query message. The management device also obtains the cipher suite of the name server by looking up the identifier of the name server in the central CSN table.

The management device then selects a .cipher that is supported by the local server and the name server. The management device can select the cipher based on a selection policy. Examples of the selection policy include, but are not limited to, the strongest common cipher, zonal encryption requirement, first match, and random selection. The management device can then strip away all other ciphers from the query message, thereby generating an enhanced query message with a reduced size. Subsequently, the management device sends the enhanced query message back to the switch, which in turn, forwards the enhanced query message to the name server. In this way, the enhanced query message facilitates efficient management of name lookup queries in the network.

In this disclosure, the term "message" refers to a group of bits that can be transported together across a network. "Message" should not be interpreted as limiting embodiments of the present invention to any networking layer.

"Message" can be replaced by other terminologies referring to a group of bits, such as "packet," "frame," "cell," or "datagram."

The term "switch" is used in a generic sense, and it can refer to any standalone or fabric switch operating in any network layer. "Switch" should not be interpreted as limiting embodiments of the present invention to layer-2 networks. Any physical or virtual device (e.g., a virtual machine, which can be a virtual switch, operating on a computing device) that can forward traffic to an end device can be referred to as a "switch." Examples of such a device include, but not limited to, a layer-2 switch, a layer-3 router, or a routing bridge.

The term "name lookup query" is used in a generic sense, and it can refer to any query associated with a distributed naming system, such as DNS. For example, a name lookup query can be a lookup query requesting an IP address associated with a name (e.g., a domain name) or a lookup query requesting a name associated with an IP address (e.g., a reverse lookup query). The term "name resolution" is also used in a generic sense, and it can refer to retrieving the address or name requested in a name lookup query. For example, a name resolution can retrieve an IP address based on a name or a name based on an IP address.

Network Architecture

Figure 1A:
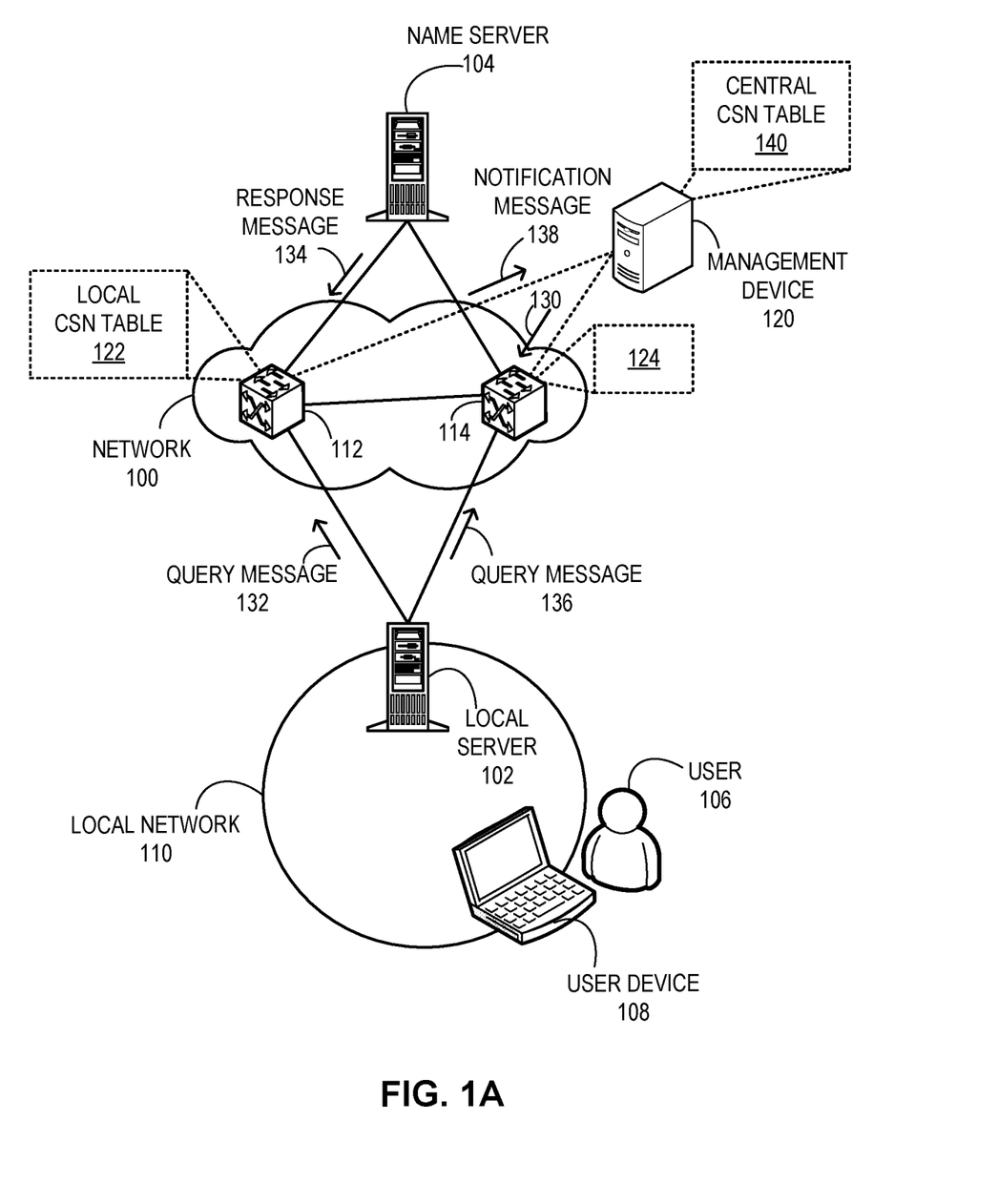
FIG. 1A illustrates an exemplary network infrastructure that supports efficient management of secure name lookup query messages, in accordance with an embodiment of the present application.

FIG. 1A illustrates an exemplary network infrastructure that supports efficient management of secure name lookup query messages, in accordance with an embodiment of the present application. As illustrated in FIG. 1A, network infrastructure 100 includes switches 102 and 104. In some embodiments, one or more switches in network 100 can be virtual switches (e.g., a software switch running on a computing device). Network 100 can be coupled to a local network 110. A user device 108 of user 106 can be in network 110. When user 106 requests a web resource based on a name, user device 108 queries a local server 102 of network 110 to obtain a corresponding address. Local server 102 can be a local resolver of name-related queries (e.g., DNS queries) in network 110.

If the cache of local server 102 does not include an entry for the name, local server 102 can send a secure lookup query message 132 to a name server 104 (e.g., based on DNSSEC). Query message 132 can be a DNS query message for the name. With existing technologies, local server 102 includes the local cipher suite in query message 132. Upon receiving query message 132, name server 104 selects a cipher that is supported by both servers 102 and 104. Name server 104 then generates a secure response message 134 comprising the name resolution of the name. The name resolution may provide an IP address associated with the name. Name server 104 encrypts response message 134 with the selected cipher and sends encrypted response message 134 to local server 102.

However, including the cipher suite significantly increases the size of query message 132. If the size of query message 134 is large, network 100 may incur a number of issues, such as network congestion, IP fragmentation, and amplified DDoS attacks. In particular, if name server 104 is queried repeatedly and the same local server 102 repeatedly sends its cipher suite, the underlying traffic in network 100 can be significant and unnecessary.

To solve this problem, in addition to the name resolution, name server 104 can include its cipher suite in response message 134. Upon receiving response message 134, switch 112 can obtain the cipher suite from response message 134. Switch 112 can then create an entry corresponding to name server 104 in a local CSN table 122. The entry can include an identifier of name server 104, the cipher suite of name server 104, and a TTL associated with the cipher suite. In this way, switch 112 can learn the cipher suite of name server 104.

In some embodiments, switch 112 sends a notification message 138 comprising the cipher suite to a management device 120 of network 100. If network 100 is an SDN, and switches 112 and 114 are managed based on an SDN protocol, such as OpenFlow, management device 120 can be a controller of the SDN. Management device 120 can also include a control plane manager configured to facilitate control information to the switches of network 100 via a control plane. Device 120 can then create an entry corresponding to name server 104 in a central CSN table 140. This entry in table 140 can also include the identifier of name server 104, the cipher suite, and the corresponding TTL. Device 120 can also distribute the cipher suite of name server 104 to other switches of network 100, such as switch 114. This allows switch 114 to learn the cipher suite of name server 104 as well and store the cipher suite in a local CSN table 124.

Suppose that switch 114 receives a subsequent secure name lookup query message 136, which is from local server 102 and destined to name server 104. Switch 114 can obtain the cipher suite of local server 102 from query message 136 and determine that the ciphers for both local server 102 and name server 104 are known. Consequently, switch 114 can determine that network 100 can select one of the common ciphers. Switch 114 then forwards query message 136 to device 120. Device 120 obtains the cipher suite of local server 102 from query message 136. Device 120 also obtains the cipher suite of name server 104 by looking up the identifier of name server 104 in central CSN table 140.

Device 120 then selects a .cipher that is supported by local server 102 and name server 104. Device 120 can select the cipher based on a selection policy. Device 120 then strips away all other ciphers from query message 136, thereby generating an enhanced query message 130. Since query message 130 includes only one cipher, the size of query message 130 can be significantly smaller than that of query message 136. Subsequently, device 120 sends query message back 130 to switch 114, which in turn, forwards query message 130 to name server 104. some embodiments, switch 114 can generate query message 130 by applying the enhancement operation on query message 136 based on local CSN table 124 and the cipher suite of local server 102 in query message 136. This allows switch 114 (or switch 112) to enhance a query message without forwarding that query message to device 120.

The size of each cipher is approximately 256 bits. A local server may support a large number of ciphers. On average, a typical local server may support ten different ciphers (e.g., 320 bytes). The packet size reduction mechanism removes all the additional ciphers from query message 130 and includes the most secure cipher supported by both servers 102 and 104. This process can remove about 90% of the cipher information (e.g., approximately 288 bytes) from query message 136. If network 100 forwards a large number of query messages, the efficient management of query messages can significantly reduce the traffic overhead in network 100.

In some embodiments, device 120 can configure switches 112 and 114 with a flow rule for the size reduction operation of the efficient management of query messages. Switches 112 and 114 use the flow rule to determine which messages should be forwarded to name server 104 and which messages should be forwarded to device 120 for enhancement.

The flow rule allows switches 112 and 114 to identify a query or a response message, and dictates how to process the corresponding message.

The following dynamic flow rule can perform the enhancement operation:

```
If ( Packet.type = = DNS )
{
    If ( Packet.type = = DNS_RESPONSE )
    {
        SendToController (Packet.source , Packet.ciphers);
        Packet.forward( );
    }
    Else if (Packet.type = = DNS_QUERY )
    {
        If ( Packet.destination in CSN_table )
            Packet.do_SizeReduction( );
        Else
            Packet.forward( );
            // CSN table does not have ciphers for this IP
    }
}
```

Figure 1B:
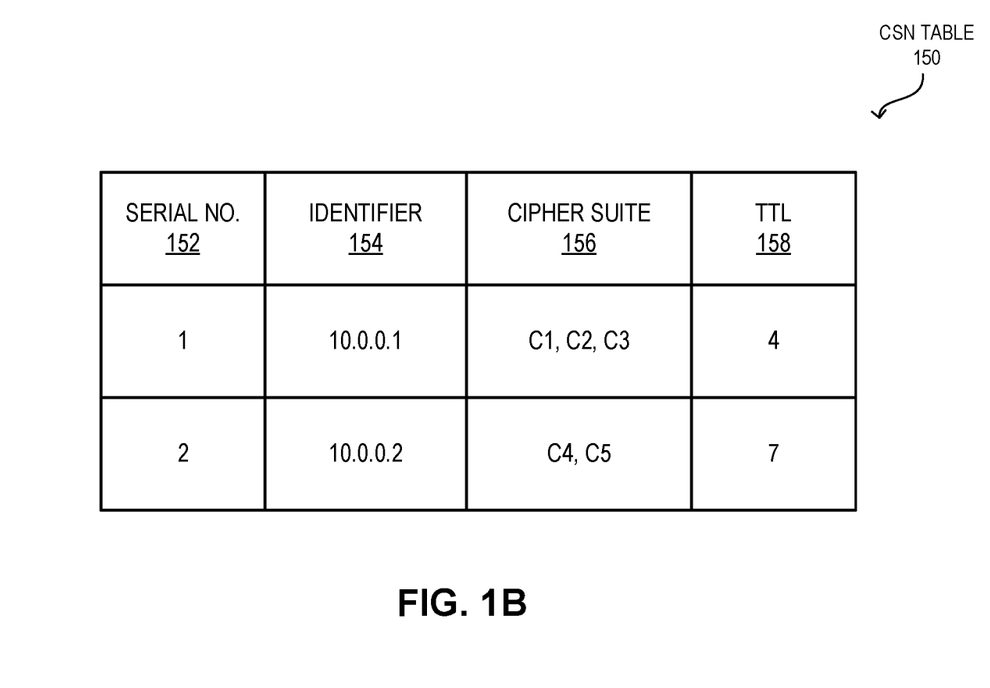
FIG. 1B illustrates an exemplary cipher suite negotiation (CSN) table for facilitating efficient management of secure name query messages, in accordance with an embodiment of the present application.

FIG. 1B illustrates an exemplary CSN table for facilitating efficient packet management of secure name lookup query messages, in accordance with an embodiment of the present application. A CSN table 150 can include one or more entries. A respective entry may correspond to a name server. A respective entry of table 150 can include a serial number 152, an identifier 152 of the corresponding name server, the cipher suite 156 of the name server, and a TTL 158. If TTL 158 expires, the corresponding entry may be removed from table 150. In this example, an entry of table 150 can include a serial number of 1, an IP address 10.0.0.1, a cipher suite comprising ciphers C1, C2, and C3, and a TTL value of 4. Another entry can include a serial number of 2, an IP address 10.0.0.2, a cipher suite comprising ciphers C4 and C5, and a TTL value of 7.

If table 150 is a central CSN, such as CSN 140 of FIG. 1A, a respective entry can include serial number 152, an identifier 152, cipher suite 156, and TTL 158. However, if table 150 is a local CSN, such as CSN 133 of FIG. 1A, an entry may include fewer fields. In particular, since a management device selects the cipher for a query message, a switch may not need to store the cipher suite of a name server. As a result, local CSN 150 may include serial number 152, an identifier 152, and TTL 158.

Efficient Management of Query Messages

Figure 2A:
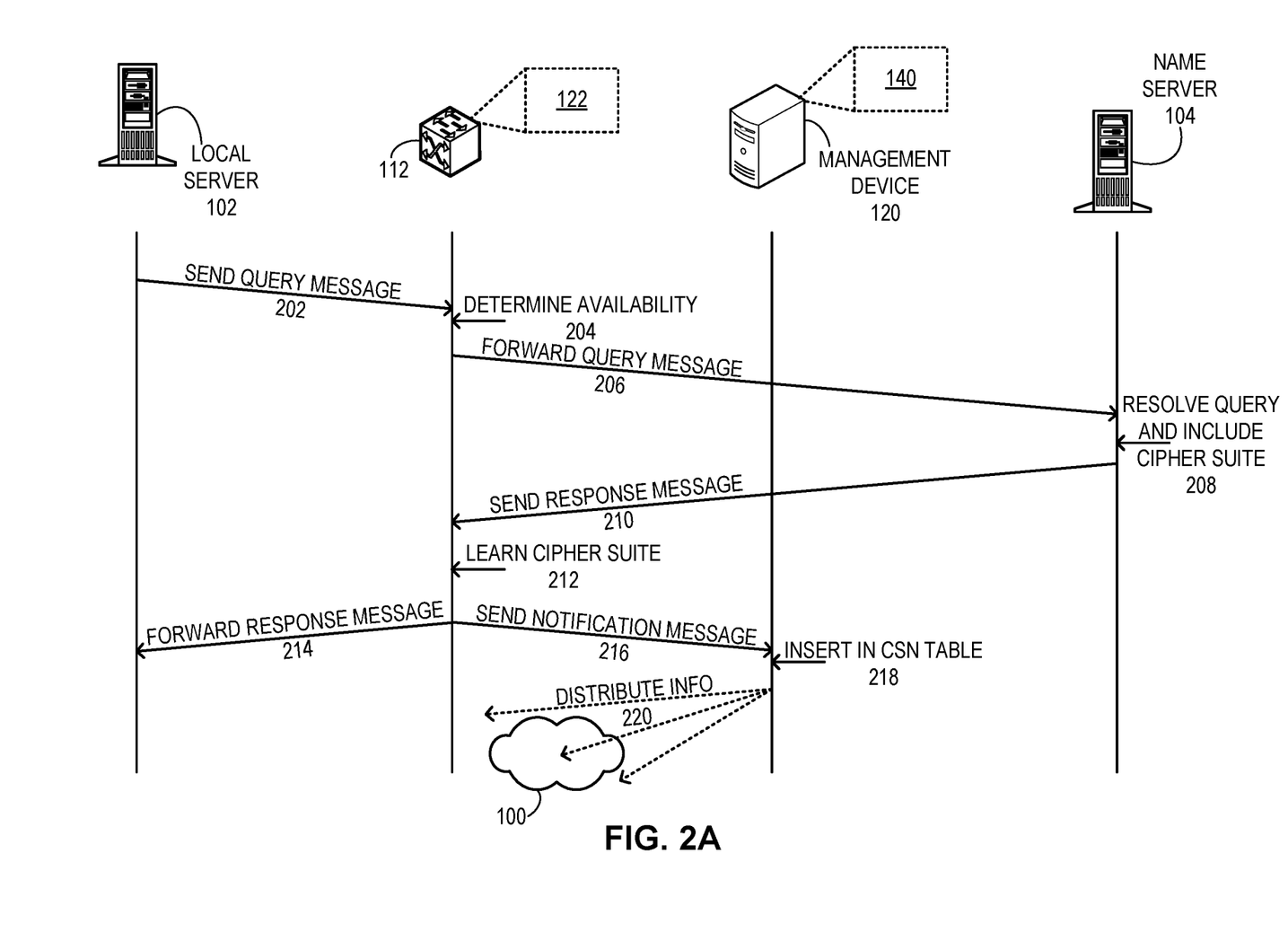
FIG. 2A illustrates an exemplary communication for learning the ciphers of a name server, in accordance with an embodiment of the present application.

FIG. 2A illustrates an exemplary communication for learning the ciphers of a name server, in accordance with an embodiment of the present application. During operation, local server 102 sends a secure name lookup query message, which is destined to name server 104, to switch 112 (operation 202). Switch 112 then determines whether the cipher suite of name server 104 is available (operation 204). In some embodiments, switch 112 can look up the identifier of name server 104 (i.e., the destination IP address of the query message) in local CSN table 112. The lookup operation does not find an entry in table 112, switch 112 determines that the cipher suite is not available.

If the cipher suite is not available, the query message can be a first query message sent to the name server or the TTL for the cipher suite has been expired. Switch 112 then forwards the query message to name server 104 (operation 206). Upon receiving the query message, name server 104 resolves the query (i.e., obtains the address corresponding to the name) and includes its cipher suite in a secure response message (operation 208). Name server 104 then sends the response message, which is destined to local server 102, to switch 112 (operation 210). Switch 112 then learns the cipher suite from the response message (operation 212). Subsequently, switch 112 forwards the response message to local server 102 (operation 214).

Switch 112 can also send a notification message to device 120 (operation 216). The notification message can include the information associated with the cipher suite of name server 102. Device 120 then inserts the information in central CSN table 140 (operation 218). Device 120 can also distribute the information to the other switches of network 100 (operation 220). For example, if device 120 is an SDN controller, device 120 can install the information in a respective switch of network 100.

Figure 2B:
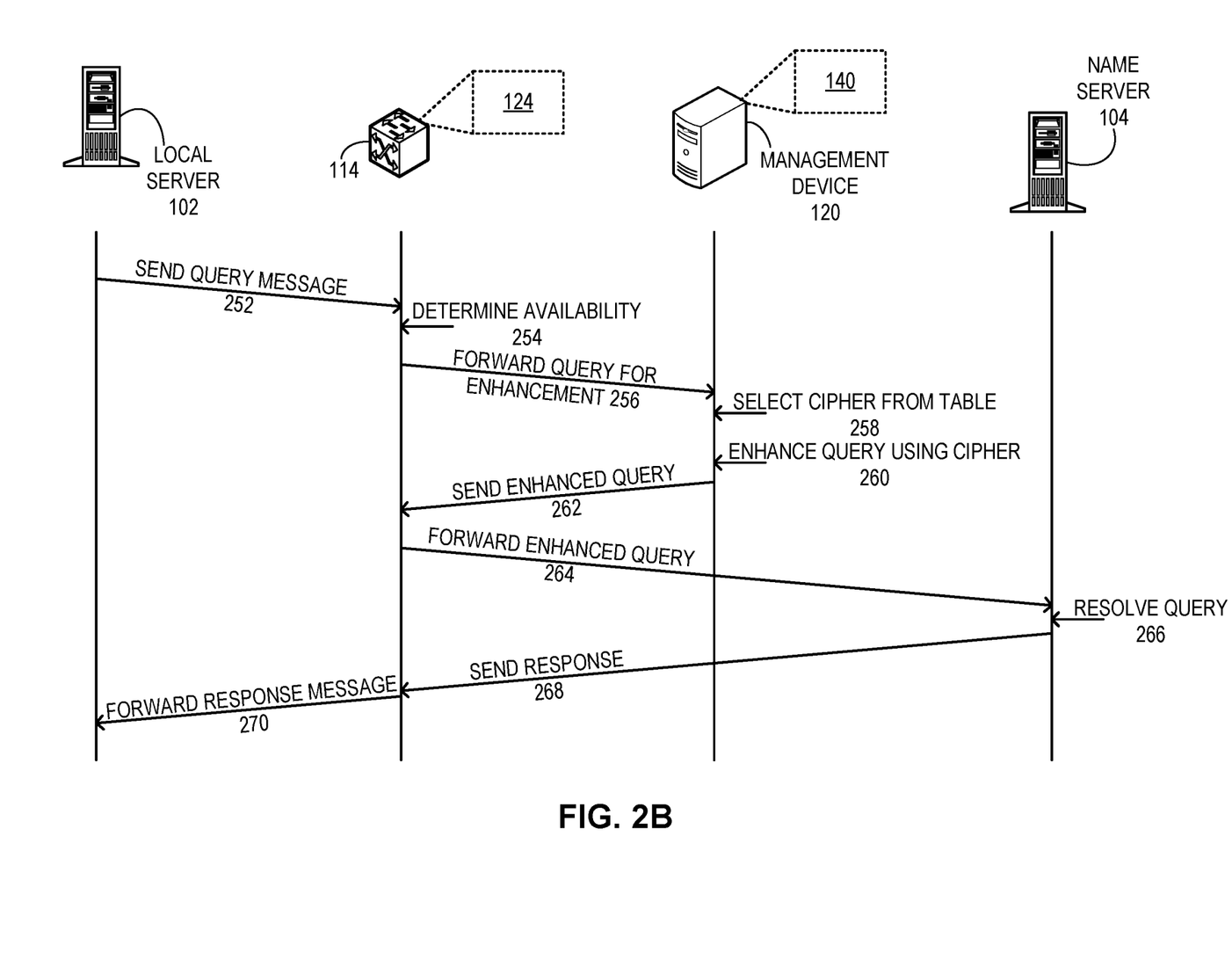
FIG. 2B illustrates an exemplary communication for enhancing a name lookup query based on the ciphers of a name server, in accordance with an embodiment of the present application.

FIG. 2B illustrates an exemplary communication for enhancing a name lookup query based on the ciphers of a name server, in accordance with an embodiment of the present application. During operation, local server 102 sends a secure name lookup query message, which is destined to name server 104, to switch 114 (operation 252). Switch 114 then determines whether the cipher suite of name server 104 is available (operation 254). Switch 114 can look up the identifier of name server 104 in local CSN table 114 and obtain a corresponding entry. Consequently, switch 114 determines that the cipher suite is available. Switch 114 then forwards the query message to device 120 for enhancement (operation 256).

Subsequently, device 120 can select a cipher from central CSN table 140 based on a selection policy (operation 258) and enhances the query using the cipher (operation 260). The enhancement operation includes removing other ciphers from the query message. Device 120 then sends the enhanced query message to switch 114 (operation 262). Switch 114 forwards the enhanced query message to name server 104 (operation 264). Upon receiving the enhanced query message, name server 104 resolves the query (operation 266). In some embodiments, the enhanced query message can include an indicator that indicates that the query message has been enhanced. As a result, name server 104 refrains from including its cipher suite in a secure response message. Name server 104 then sends the response message, which is destined to local server 102 and includes the resolution, to switch 114 (operation 268). Switch 112, in turn, forwards the response message to local server 102 (operation 270).

Operations

Figure 3A:
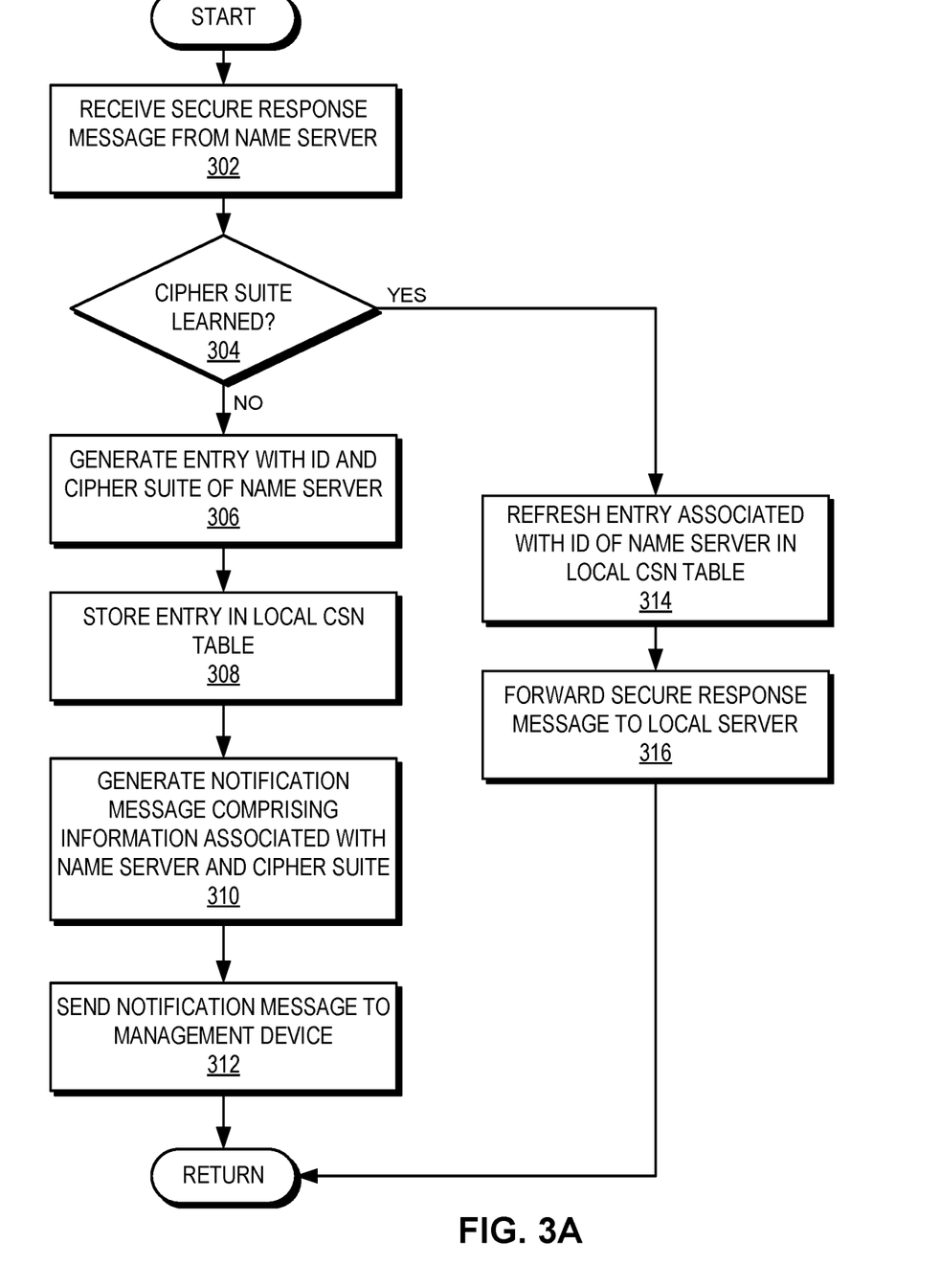
FIG. 3A presents a flowchart illustrating a method of a switch learning the ciphers of a name server, in accordance with an embodiment of the present application.

FIG. 3A presents a flowchart illustrating a method of a switch learning the ciphers of a name server, in accordance with an embodiment of the present application. During operation, the switch receives a secure response message, which can include a name resolution and is destined to a local server, from a name server (operation 302). The switch then checks whether the cipher suite of the name server has been learned (operation 304). The switch may look up the identifier of the name server (e.g., the source address of the response message) in a local CSN table to determine whether the cipher suite of the name server has been learned. If the lookup operation finds an entry, the switch may determine that the cipher suite has been learned.

If the cipher suite of the name server has been learned, the switch refreshes an entry associated with the identifier of the name server in the local CSN table (e.g., resets the TTL) (operation 314) and forwards the secure response message to the local server (operation 316). On the other hand, if the cipher suite of the name server has not been learned, the switch generates an entry with an identifier and the cipher suite of the name server (operation 306). The switch then stores the entry in the local CSN table (operation 308). In addition, the switch generates a notification message comprising information associated with the name server and the cipher suite (operation 310) and sends the notification message to the management device (operation 312).

Figure 3B:
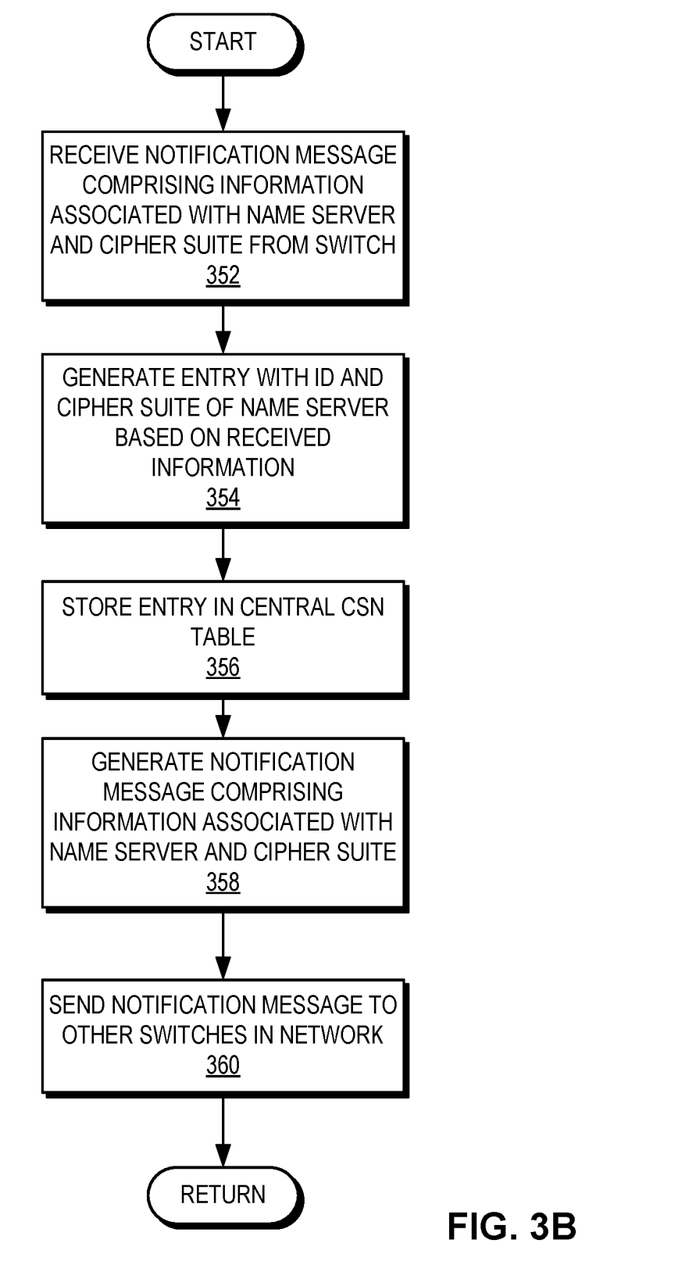
FIG. 3B presents a flowchart illustrating a method of a management device learning the ciphers of a name server, in accordance with an embodiment of the present application.

FIG. 3B presents a flowchart illustrating a method of a management device learning the ciphers of a name server, in accordance with an embodiment of the present application. During operation, the device receives a notification message comprising information associated with the name server and the cipher suite from a switch (operation 352). The device generates an entry with an identifier and the cipher suite of the name server based on the received information (operation 354). The switch then stores the entry in the central CSN table (operation 356). In addition, the switch generates a notification message comprising information associated with the name server and the cipher suite (operation 358), and sends the notification message to other switches of the network (operation 312). This allows a respective of the other switches to create an entry corresponding to the name server in the local CSN table.

Figure 4A:
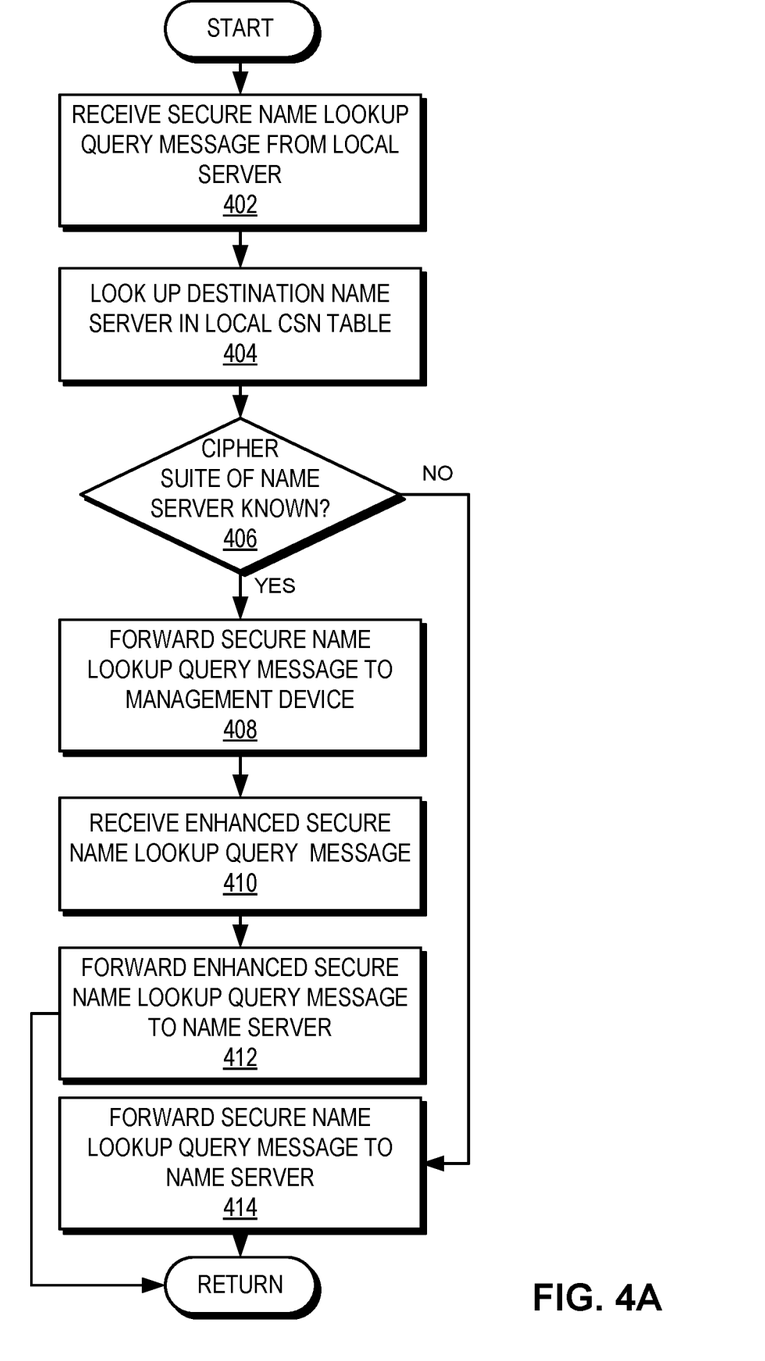
FIG. 4A presents a flowchart illustrating a method of a switch forwarding a name lookup query for enhancement, in accordance with an embodiment of the present application.

FIG. 4A presents a flowchart illustrating a method of a switch forwarding a name lookup query for enhancement, in accordance with an embodiment of the present application. During operation, the switch receives a secure name lookup query message, which can include a name query and be destined to a name server, from a local server (operation 402). The switch then looks up the destination name server (e.g., an IP address of the server) in a local CSN table (operation 404). The switch then checks whether the cipher suite of the name server is known by the switch (operation 406).

If the name server cipher suite is known by the switch, the switch forwards the secure name lookup query message to a management device (operation 408) and receives an enhanced secure name lookup query message from the management device (operation 410). The enhanced secure name lookup query message can be a DNSSEC query message with the common cipher and all other ciphers removed. The switch then forwards the enhanced secure name lookup query message to the name server (operation 412). On the other hand, if the name server cipher suite is not known, the switch forwards the secure name lookup query message to the name server (operation 414).

Figure 4B:
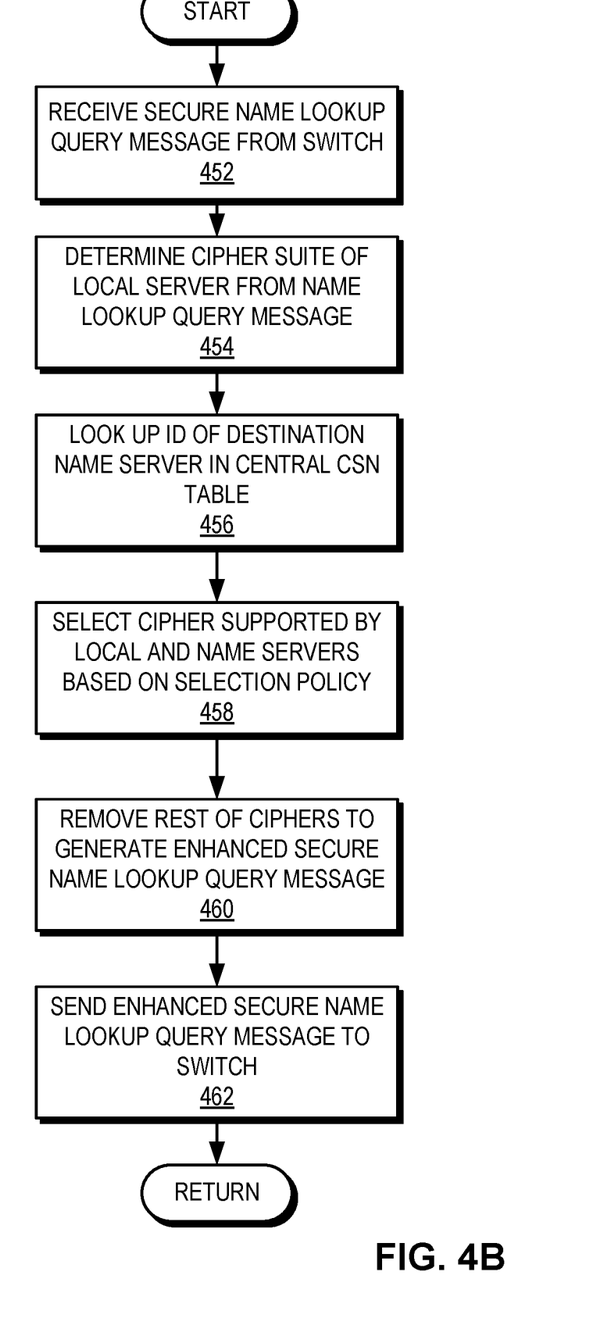
FIG. 4B presents a flowchart illustrating a method of a management device enhancing a name lookup query message, in accordance with an embodiment of the present application.

FIG. 4B presents a flowchart illustrating a method of a management device enhancing a name lookup query, in accordance with an embodiment of the present application. During operation, the management device receives a name lookup query message from a switch (operation 452) and determines the cipher suite of the local server form the name lookup query message (operation 454). The device then looks up the identifier of the destination name server (e.g., the destination address of the message) in the central CSN table (operation 456). Subsequently. the device selects a cipher supported by local and name servers based on a selection policy (operation 458). The device then removes the rest of the ciphers from the name lookup query message to generate an enhanced name lookup query message (operation 460). The device can then send the enhanced name lookup query message to the switch (operation 462).

Exemplary Computer System and Apparatus

Figure 5:
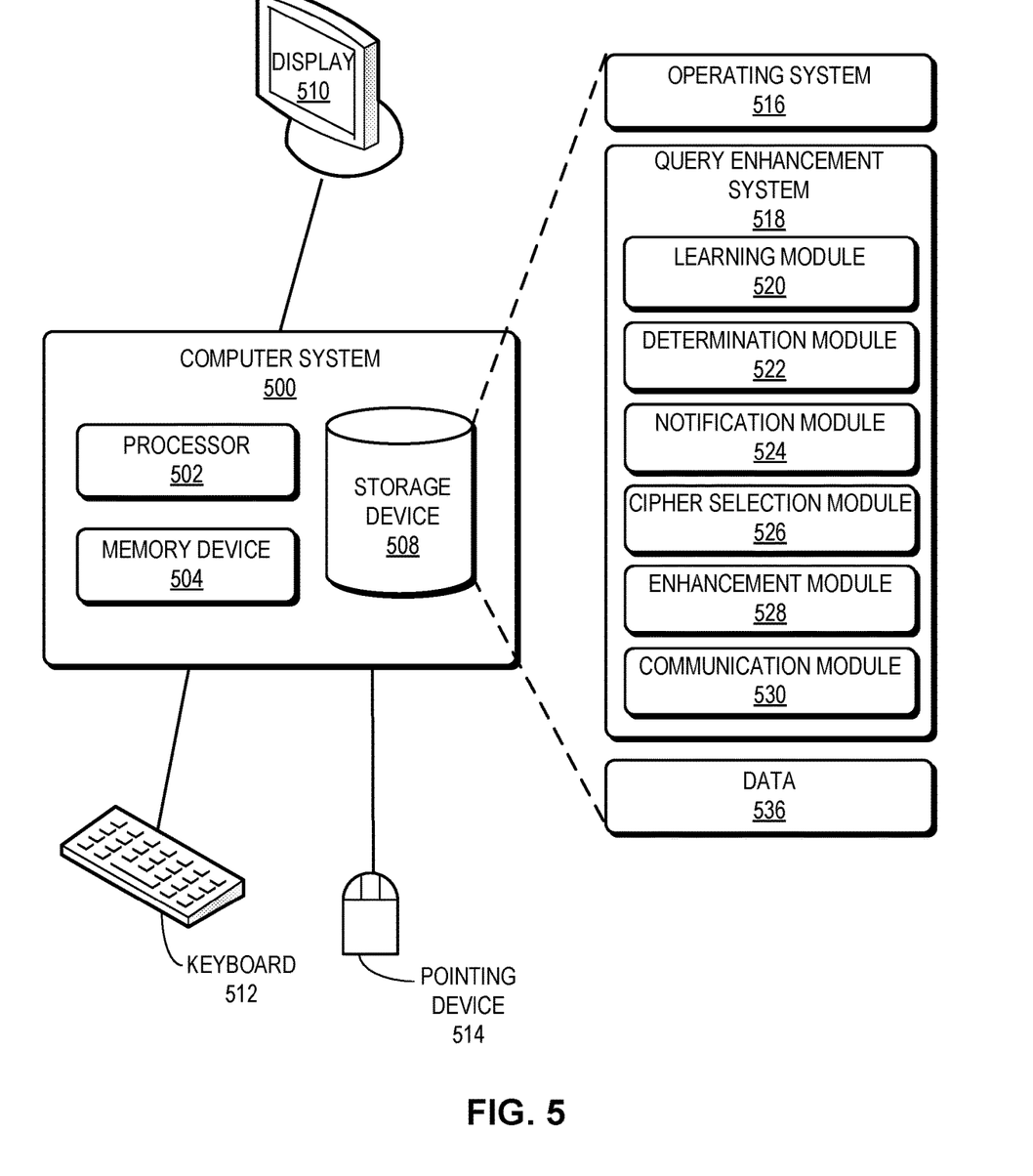
FIG. 5 illustrates an exemplary computer system that facilitates efficient management of secure name lookup query messages, in accordance with an embodiment of the present application.

FIG. 5 illustrates an exemplary computer system that facilitates efficient management of secure name lookup query messages, in accordance with an embodiment of the present application. Computer system 500 includes a processor 502, a memory 504, and a storage device 508. Memory 504 can include volatile memory (e.g., a dual in-line memory module (DIMM)). Furthermore, computer system 500 can be coupled to a display device 510, a keyboard 512, and a pointing device 514. Storage device 508 can store an operating system 516, a query enhancement system 518, and data 536. Query enhancement system 518 can facilitate the enhancement operations of switches 112 and 114, and management device 120. It should be noted that, depending on the operations executed on a specific device, query enhancement system 518 may include a subset of the modules on that device.

Query enhancement system 518 can include instructions, which when executed by computer system 500, can cause computer system 500 to perform methods and/or processes described in this disclosure. Specifically, query enhancement system 518 can include instructions for learning the cipher suite of a name server from a query response message (learning module 520). Furthermore, query enhancement system 518 can include instructions for storing the learned cipher suite in a data structure (learning module 520).

Query enhancement system 518 can also include instructions for determining whether the cipher suite of a name server has been learned for a query or query response message (determination module 522). In addition, query enhancement system 518 can also include instructions for forwarding a query message for enhancement (determination module 522). Furthermore, query enhancement system 518 can include instructions for sending information associated with the learned cipher suite to a management device (notification module 524).

Moreover, query enhancement system 518 includes instructions for selecting a cipher for a query message (cipher selection module 526). In some embodiments, query enhancement system 518 can select the cipher based on a selection policy. Query enhancement system 518 also includes instructions for enhancing a query message by stripping all ciphers other than the selected cipher from the query message (enhancement module 528). Query enhancement system 518 can also include instructions for sending and receiving name queries and/or query responses, and other layer-2 and/or layer-3 messages (communication module 530).

Data 536 can include any data that is required as input or that is generated as output by the methods and/or processes described in this disclosure. Specifically, data 536 can store at least: a local CSN table and a central CSN table.

Figure 6:
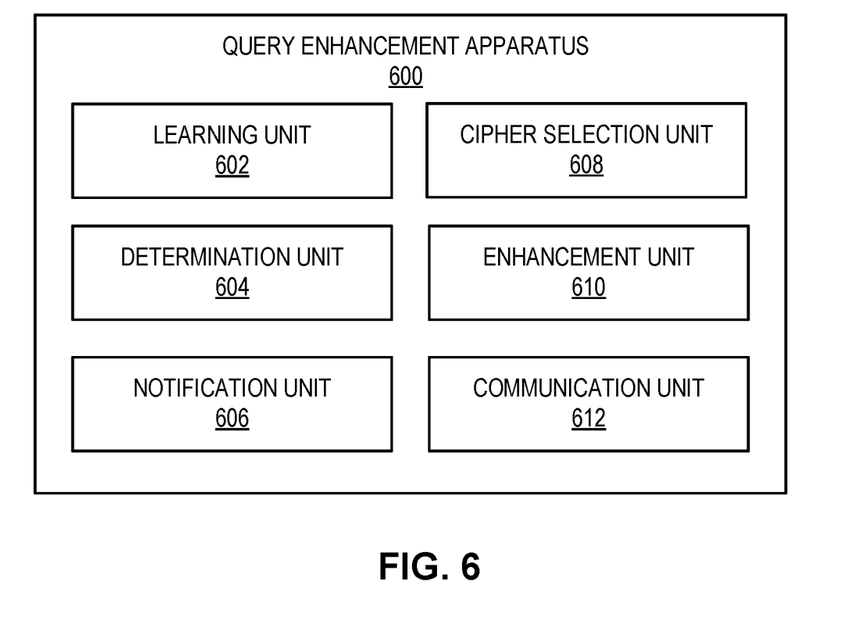
FIG. 6 illustrates an exemplary apparatus that facilitates efficient management of secure name lookup query messages, in accordance with an embodiment of the present application.

FIG. 6 illustrates an exemplary apparatus that facilitates efficient management of secure name lookup query messages, in accordance with an embodiment of the present application. Query enhancement apparatus 600 can comprise a plurality of units or apparatuses which may communicate with one another via a wired, wireless, quantum light, or electrical communication channel. Apparatus 600 may be realized using one or more integrated circuits, and may include fewer or more units or apparatuses than those shown in FIG. 6. Further, apparatus 600 may be integrated in a computer system, or realized as a separate device which is capable of communicating with other computer systems and/or devices. Apparatus 600 may also be a network device (e.g., a switch, a router, etc.).

Specifically, apparatus 600 can comprise units 602-612, which perform functions or operations similar to modules 520-530 of computer system 500 of FIG. 5, including: a learning unit 602; a determination unit 604; notification unit 606; a cipher selection unit 608; an enhancement unit 610; and a communication unit 612.

Note that the above-mentioned modules can be implemented in hardware as well as in software. In one embodiment, these modules can be embodied in computer-executable instructions stored in a memory which is coupled to one or more processors in computer system 500 and/or apparatus 600. When executed, these instructions cause the processor(s) to perform the aforementioned functions.

In summary, embodiments of the present invention provide a system and a method that facilitates efficient management of secure name lookup query messages. During operation, the system determines a first set of ciphers supported by a name server from a name lookup response message. The system then inserts an entry associated with the name server in a data structure in a local storage device. Subsequently, the system receives, from a local name server, a name lookup query message comprising a second set of ciphers supported by the local name server. The name lookup query message can be destined to the name server. The system then selects the name lookup query message for an update operation based on the entry of the data structure. The update operation can include removing ciphers from the name lookup query message except a common cipher in the first and second sets. The system determines an egress port corresponding to the name server for the updated name lookup query message.

The methods and processes described herein can be embodied as code and/or data, which can be stored in a non-transitory computer-readable storage medium. When a computer system reads and executes the code and/or data stored on the non-transitory computer-readable storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
   determining, by a switch, a first set of ciphers supported by a name server based on a name lookup response message;
   inserting, in a data structure stored in a storage device of the switch, an entry associated with the name server;
   identifying a second set of ciphers supported by a local name server in a name lookup query message from the local name server, wherein the name lookup query message is destined to the name server;
   selecting, based on the entry in the data structure, the name lookup query message for an update operation, wherein the update operation includes removing ciphers from the name lookup query message except a common cipher, which is present in both the first and second sets of ciphers; and
   determining an egress port corresponding to the name server for the updated name lookup query message.

2. The method of claim 1, wherein the name server is a domain name system (DNS) server, and the name lookup response message is a Domain Name System Security Extensions (DNSSEC) message.

3. The method of claim 1, further comprising:
   sending the name lookup query message to a management device capable of configuring the switch; and
   receiving the updated name lookup query from the management device.

4. The method of claim 3, wherein the management device is one of:
   a controller of a software-defined network (SDN); and
   a control plane manager configured to facilitate control information to the switch.

5. The method of claim 3, further comprising sending a notification message to the management device, wherein the notification message comprises the first set of ciphers and an identifier of the name server.

6. The method of claim 3, further comprising:
   receiving, from the management device, a notification message comprising information associated with a second name server; and
   inserting, in the data structure, a second entry associated with the second name server.

7. The method of claim 1, wherein the entry of the data structure comprises one or more of:
   an identifier of the name server and a time to leave (TTL) value associated with the entry; and
   the first set of ciphers.

8. The method of claim 1, further comprising refreshing the entry in response to receiving a second name lookup response message from the name server.

9. The method of claim 1, wherein selecting the name lookup query message further comprises:
   looking up an identifier of the name server in the data structure; and
   in response to identifying the entry in the data structure based on the lookup, selecting the name lookup query message for an update operation.

10. The method of claim 1, further comprising:
    selecting the common cipher, which is present in both the first and second sets of ciphers, based on a selection policy; and
    executing the update operation based on the common cipher.

11. A computer system, comprising:
    a processor;
    a storage device; and
    a memory coupled to the processor and storing instructions, which when executed by the processor cause the processor to perform a method, the method comprising:
    determining a first set of ciphers supported by a name server based on a name lookup response message;
    inserting, in a data structure stored in the storage device, an entry associated with the name server;
    identifying a second set of ciphers supported by a local name server in a name lookup query message from the local name server, wherein the name lookup query message is destined to the name server;
    selecting, based on the entry in the data structure, the name lookup query message for an update operation, wherein the update operation includes removing ciphers from the name lookup query message except a common cipher, which is present in both the first and second sets of ciphers; and
    determining an egress port corresponding to the name server for the updated name lookup query message.

12. The computer system of claim 11, wherein the name server is a domain name system (DNS) server, and the name lookup response message is a Domain Name System Security Extensions (DNSSEC) message.

13. The computer system of claim 11, wherein the method further comprises:
   sending the name lookup query message to a management device capable of configuring the computer system; and
   receiving the updated name lookup query from the management device.

14. The computer system of claim 13, wherein the management device is one of:
   a controller of a software-defined network (SDN); and
   a control plane manager configured to facilitate control information to the computer system.

15. The computer system of claim 13, wherein the method further comprises sending a notification message to the management device, wherein the notification message comprises the first set of ciphers and an identifier of the name server.

16. The computer system of claim 13, wherein the method further comprises:
   receiving, from the management device, a notification message comprising information associated with a second name server; and
   inserting, in the data structure, a second entry associated with the second name server.

17. The computer system of claim 11, wherein the entry of the data structure comprises one or more of:
   an identifier of the name server and a time to leave (TTL) value associated with the entry; and
   the first set of ciphers.

18. The computer system of claim 11, wherein the method further comprises refreshing the entry in response to receiving a second name lookup response message from the name server.

19. The computer system of claim 11, wherein selecting the name lookup query message further comprises:
   looking up an identifier of the name server in the data structure; and
   in response to identifying the entry in the data structure based on the lookup, selecting the name lookup query message for an update operation.

20. The computer system of claim 11, wherein the method further comprises:
   selecting the common cipher, which is present in both the first and second sets of ciphers, based on a selection policy; and
   executing the update operation based on the common cipher.

* * * * *